United States Patent [19]
Kaufhold et al.

[11] Patent Number: 6,166,135
[45] Date of Patent: Dec. 26, 2000

[54] ALIPHATIC SINTERABLE THERMOPLASTIC POLYURETHANE MOULDING COMPOSITIONS OF REDUCED MECHANICAL STRENGTH

[75] Inventors: Wolfgang Kaufhold, Köln; Hans-Georg Hoppe, Leichlingen; Rainer Ohlinger, Hannover; Michael Kalbe, Weinheim; Hans-Hinrich Kruse, Barsinghausen, all of Germany

[73] Assignees: Bayer Aktiengesellschaft, Leverkusen; Benecke-Kaliko AG, Hanover, both of Germany

[21] Appl. No.: 09/225,145

[22] Filed: Jan. 4, 1999

[30] Foreign Application Priority Data

Jan. 7, 1998 [DE] Germany .............................. 198 00 287

[51] Int. Cl.[7] ................................ C08J 3/00; C08K 3/20; C08L 75/00; C08F 8/30; C08F 283/04
[52] U.S. Cl. ........................... 525/123; 524/507; 525/455
[58] Field of Search ............................. 524/507; 525/123, 525/455

[56] References Cited

U.S. PATENT DOCUMENTS

| | | | |
|---|---|---|---|
| 3,541,183 | 11/1970 | Kallert et al. | 260/858 |
| 5,218,058 | 6/1993 | Zeitler et al. | 525/453 |
| 5,525,274 | 6/1996 | Grimmer | 264/13 |
| 5,541,227 | 7/1996 | Loew et al. | 514/568 |
| 5,585,431 | 12/1996 | Igarashi et al. | 524/425 |
| 5,824,738 | 10/1998 | Humphrey et al. | 524/715 |

FOREIGN PATENT DOCUMENTS

| | | |
|---|---|---|
| 29 01 774 | 7/1980 | Germany . |
| 39 32 923 | 4/1991 | Germany . |

*Primary Examiner*—Patrick D. Niland
*Attorney, Agent, or Firm*—Joseph C. Gil; Aron Preis

[57] ABSTRACT

The invention relates to light-stable sinterable thermoplastic polyurethane molding compositions of reduced mechanical strength which can be processed by the powder-slush process. The molding compositions according to the invention are particular suitable for the production of grained sintered films for interior lining of means of transport, in particular as a covering for airbags in motor vehicles.

11 Claims, No Drawings

ALIPHATIC SINTERABLE THERMOPLASTIC POLYURETHANE MOULDING COMPOSITIONS OF REDUCED MECHANICAL STRENGTH

The invention relates to light-stable sinterable thermoplastic polyurethane moulding compositions of reduced mechanical strength which can be processed by the powder-slush process. The moulding compositions according to the invention are particularly suitable for the production of grained sintered films for interior lining of means of transport, in particular as a covering for airbags in motor vehicles.

Aliphatic thermoplastic polyurethanes are already described for use in interior fitting of motor vehicles, e.g. in surface linings of instrument panels, for example in DE-C 42 03 307. There is of course here a desire to achieve a uniform appearance of the entire surface lining and therefore to produce this from a single material. However, there is the problem here that the usual aliphatic thermoplastic polyurethanes of high light-fastness and heat stability are not suitable as a covering for airbags because of their outstanding mechanical properties, in particular the high tear strength. There was therefore the object of developing materials of high light-fastness and heat stability which have a lower mechanical strength than the known thermoplastic polyurethanes.

DE-AS 16 94 135 describes a process for the preparation of crosslinked polyurethanes from higher molecular weight linear polyhydroxy compounds which are a mixture of 70 to 90 wt. % hexanediol polycarbonate, which has been prepared by reaction of 1,6-hexanediol and diaryl carbonate, and 10 to 30 wt. % mixed polyesters of, inter alia, adipic acid, 1,6-hexanediol and 2,2'-dimethyl-1,3-propanediol diisocyanates and low molecular weight chain lengthening agents which contain at least two hydrogen atoms which react with isocyanate groups, for example 1,4-butanediol. Exclusively aromatic diisocyanates are to be employed. The crosslinking of the polyurethanes is achieved by using an excess of diisocyanates. The polyurethane elastomers prepared from these starting substances retain the high stability to hydrolysis resulting from the polycarbonate. Furthermore, however, such elastomers also show an improved resistance to low temperatures and processability compared with elastomers for the preparation of which pure 1,6-hexanediol polycarbonate has been employed as the polyol component. The better processability has an effect in particular in the liquid phase—for example during casting processes—since the polyester-polycarbonate mixtures used have a lower viscosity at the processing temperatures than the pure hexanediol polycarbonate, and for this reason it is easier to cast the resulting film without bubbles. The products produced by this process can be employed in machine and vehicle construction.

DE-C 42 03 307 describes a polyurethane moulding composition which can be processed thermoplastically in the form of sintering powder for the production of grained sintered films, the powder comprising exclusively linear aliphatic components. The polyol component is composed of 60 to 80 parts by weight of an aliphatic polycarbonatediol with a molecular weight $\overline{M}_n$ of 2,000 and 40 to 20 parts by weight of a polydiol based on adipic acid, hexanediol and neopentylglycol with a molecular weight $\overline{M}_n$ of 2,000. The mixture furthermore comprises hexamethylene 1,6-diisocyanate in an equivalent ratio 2.8:1.0 to 4.2:1.0, based on the polyol mixture, and 1,4-butanediol as a chain lengthening agent, the equivalent ratio of the 1,4-butanediol with respect to the polyol mixture being 1.3:1.0 to 3.3:1.0. These materials are distinguished, inter alia, by a high tensile strength, initial tearing strength and tear propagation resistance. EP-A 399 272 also discloses polyurethane films with good mechanical properties, in particular high tear strength.

It has now been found that materials of high light-fastness and heat stability which have a lower mechanical strength than the known thermoplastic polyurethanes can be obtained if light-stable thermoplastic polyurethanes are modified with certain further components.

The invention therefore provides sinterable thermoplastic moulding compositions comprising a thermoplastic polyurethane based on an aliphatic diisocyanate and at least one further representative from the group consisting of polyvinyl chloride (PVC), polymethyl methacrylate (PMMA), ethylene/vinyl acetate copolymers (EVA) and plasticizers. The moulding compositions according to the invention preferably have a tear strength at room temperature of not more than 20 N/mm$^2$, particularly preferably not more than 15 N/mm$^2$, and an elongation at break at room temperature of not more than 450%, particularly preferably not more than 300% (in each case measured in accordance with EN ISO 527-3/5). Preferably, the tear strength of the moulding compositions according to the invention at −35° C. is not more than 30 N/mm$^2$, particularly not more than 25 N/mm$^2$, and the elongation at break at −35° C. is not more than 200%, particularly preferably not more than 100% (in each case measured in accordance with EN ISO 527-3/2). The melt index (MVR) of the moulding compositions according to the invention, measured at 200° C. with a load of 2.16 kg, is preferably at least 10 cm$^3$/10 min, particularly preferably at least 20 cm$^3$/10 min.

In a preferred embodiment, the moulding composition according to the invention comprise
- 50 to 90 parts by wt. thermoplastic polyurethane based on an aliphatic diisocyanate,
- 10 to 50 parts by wt. PMMA,
- 0 to 10 parts by wt. EVA,
- 0 to 10 parts by wt. plasticizer.

Examples of particularly preferred embodiments are moulding compositions which comprise, per 100 parts by wt. moulding composition, up to 40 parts by wt., in particular up to 30 parts by wt. PMMA and those which, as well as PMMA, additionally comprise up to 10 parts by wt., in particular up to 7 parts by wt. plasticizer or EVA.

In another preferred embodiment, the moulding compositions according to the invention comprise
- 10 to 90 parts by wt. thermoplastic polyurethane based on an aliphatic diisocyanate and
- 10 to 90 parts by wt. PVC.

Moulding compositions which comprise up to 50 parts by wt. PVC per 100 parts by wt. moulding composition are particularly preferred.

The polyurethane component of the moulding composition according to the invention is prepared by reaction of
  A) organic diisocyanate, the majority of which comprise aliphatic and/or cycloaliphatic diisocyanates, B) linear hydroxyl-terminated polyol with an average molecular weight $\overline{M}_n$ of 1,000 to 4,000, C) diols or diamines with a molecular weight of 60 to 500 as chain lengthening agents, the equivalent ratio of isocyanate and diol being from 2.3:1.0 to 6.2:1.0 and the equivalent ratio of chain lengthening agent and diol being 1.3:1.0 to 5.2:1.0.

Organic diisocyanates A) which can be employed are aliphatic and cycloaliphatic diisocyanates such as are described e.g. in Justus Liebigs Annalen der Chemie 562, p. 75–136. Examples which may be mentioned are hexamethylenediisocyanate, isophorone diisocyanate, 1,4-cyclohexanediisocyanate, 1-methyl-2,4-cyclohexanediisocyanate and 1-methyl-2,6-cyclohexanediisocyanate and the corresponding isomer mixtures, and 4,4'-, 2,4'- and 2,2'-dicyclohexylmethanediisocyanate and the corresponding isomer mixtures. The organic diisocyanate employed preferably consists of 1,6-hexamethylenediisocyanate to the extent of at least 50 wt. %.

For applications with lower light stability requirements, e.g. in dark-coloured moulding compositions, portions of the aliphatic diisocyanate can be replaced by aromatic diisocyanates. At most 40 mol % of the aliphatic diisocyanate may be replaced by aromatic diisocyanates. These are also described in Justus Liebigs Annalen der Chemie 562, p.p. 75–136. Examples are 2,4-toluylenediisocyanate, mixtures of 2,4- and 2,6-toluylenediisocyanate, 4,4'-, 2,2'- and 2,4'-diphenylmethenediisocyanate, mixtures of 2,4'- and 4,4'-diphenydiisocyanate, urethane-modified liquid 2,4- and/or 4,4'-diphenylmethanediisocyanates, 4,4'-diisocyanato-1,2-diphenylethane and 1,5-naphthylenediisocyanate.

Linear hydroxyl-terminated polyols with a molecular weight of 1,000 to 4,000 are employed as component B). These often contain small amounts of non-linear compounds resulting from the production. "Substantially linear polyols" are therefore included. Polyester- and polycarbonate-diols or mixtures of these are preferred.

Suitable polyester-diols can be prepared, for example, from dicarboxylic acids having 2 to 12 carbons atoms, preferably 4 to 6 carbon atoms, and polyhydric alcohols. Possible dicarboxylic acids are, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, e.g. in the form of a succinic, glutaric and adipic acid mixture. Where appropriate, it may be advantageous for the preparation of the polyester-diols to use, instead of the dicarboxylic acids, the corresponding dicarboxylic acid derivatives, such as carboxylic acid diesters having 1 to 4 carbon atoms in the alcohol radical, carboxylic acid anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols can be used by themselves or, if appropriate, as a mixture with one another. Further suitable compounds are esters of carbonic acid with the diols mentioned, in particular those having 4 to 6 carbon atoms, such as 1,4-butanediol or 1,6-hexanediol, condensation products of hydroxycarboxylic acids, for example hydroxycaproic acid, and polymerization products of lactones, for example optionally substituted caprolactones. Polyester-diols which are preferably used are ethanediol polyadipates, 1,4-butanediol polyadipates, ethanediol-1,4-butanediol polyadipates, 1,6-hexanediol-neopentylglycol polyadipates, 1,6-hexanediol-1, 4-butanediol polyadipates and polycaprolactones. The polyester-diols have molecular weights of 1,000 to 4,000 and can be used individually or in the form of mixtures with one another.

For applications with lower light stability requirements, e.g. in dark-coloured moulding compositions, portions of the polyester-or polycarbonate-diols can be replaced by polyether-diols.

Suitable polyether-diols can be prepared by reacting one or more alkylene oxides having 2 to 4 carbon atoms in the alkylene radical with a starter molecule which contains two bonded active hydrogen atoms. Alkylene oxides which may mentioned are e.g.: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably employed. The alkylene oxides can be used individually, alternately in succession or as mixtures. Possible starter molecules are, for example: water, aminoalcohols, such as N-alkyl-diethanolamines, for example N-methyl-diethanolamine, and diols, such as ethylene glycol, 1,3-propylene glycol, 1,4-butanediol and 1,6-hexanediol. If appropriate, mixtures of starter molecules can also be employed. Suitable polyether-diols are furthermore the polymerization products of tetrahydrofuran which contain hydroxyl groups. Tri-functional polyethers can also be employed in amounts of 0 to 30 wt. %, based on the bifunctional polyethers, but at most in an amount such that a thermoplastically processable product is formed. The substantially linear polyether-diols have molecular weights of 1,000 to 4,000. They can be used either individually or in the form of mixtures with one another.

Chain lengthening agents C) which are employed are aliphatic diols or diamines with a molecular weight of 60 to 500, preferably aliphatic diols having 2 to 14 carbon atoms, such as e.g. ethanediol, 1,6-hexanediol, diethylene glycol, dipropylene glycol and, in particular, 1,4-butanediol, or (cyclo)aliphatic diamines, such as e.g. isophoronediamine, ethylenediamine, 1,2-propylene-diamine, 1,3-propylene-diamine, N-methyl-propylene-1,3-diamine and N,N'-dimethyl-ethylenediamine. Mixtures of the above mentioned chain lengthening agents can also be employed. In addition, smaller amounts of triols can also be added.

For applications with lower light stability requirements, e.g. in dark-coloured moulding compositions, portions of the aliphatic diols and diamines can be replaced by aromatic diols and diamines. Examples of suitable aromatic diols are diesters of terephthalic acid with glycols having 2 to 4 carbon atoms, such as e.g. terephthalic acid bis-ethylene glycol or terephthalic acid bis-1,4-butanediol, hydroxyalkylene ethers of hydroquinone, such as e.g. 1,4-di-(hydroxyethyl)-hydroquinone, and ethoxylated bisphenols. Examples of suitable aromatic diamines are 2,4-toluylene-diamine and 2,6-toluylene-diamine, 3,5-diethyl-2,4- toluylene-diamine and 3,5-diethyl-2,6-toluylene-diamine, and primary mono-, di-, tri- or tetraalkyl-substituted 4,4'-diaminodiphenylmethanes.

Conventional monofunctional compounds can also furthermore be employed in small amounts, e.g. as chain stoppers or mould release aids. Examples which may be mentioned are alcohols, such as octanol and stearyl alcohol, or amines, such as butyl-amine and stearylamine.

Preferably, to prepare the moulding compositions according to the invention, an aliphatic thermoplastic polyurethane which is obtained by reaction of 100 parts by weight of a polyol mixture of
  30 to 80 parts by weight of an aliphatic polycarbonatediol with an average molecular weight $\overline{M}_n$ of 1,800 to 2,200 and
  70 to 20 parts by weight of a polyalkanediol adipate or of a polycaprolactonediol with an average molecular weight $\overline{M}_n$ of 1,000 to 4,000 and
  1,6-hexamethylenediisocyanate in an equivalent ratio of 2.3:1.0 to 6.2:1.0, based on the polyol mixture, and
  1,4-butanediol as a chain lengthening agent in an equivalent ratio of 1.3:1.0 to 5.2:1.0, based on the polyol mixture, the NCO index (calculated by multiplying by 100 the quotient of the equivalent ratios of isocyanate groups and the sum of the hydroxyl groups of the polyol mixture and chain lengthening agent) being 96 to 99.

A catalyst is preferably employed in the continuous preparation of the thermoplastic polyurethanes by the extruder or belt process. Suitable catalysts are conventional tertiary amines known from the prior art, such as e.g. triethylamine, dimethylcyclo-hexylamine, N-methylmorpholine, N,N'-dimethyl-piperazine, 2-(dimethylaminoethoxy)-ethanol, diazabicyclo-[2.2.2]-octane and the like and, in particular, organometallic compounds, such as titanic acid esters, iron compounds and tin compounds, e.g. tin diacetate, tin dioctoate, tin dilaurate or the tin-dialkyl salts of aliphatic carboxylic acids, such as dibutyltin diacetate, dibutyltin dilaurate or the like. Preferred catalysts are organometallic compounds, in particular titanic acid esters and compounds of iron or tin. Dibutyltin dilaurate is especially preferred.

In addition to the TPU components and, if appropriate, catalysts, auxiliary substances and additives can also be added. Examples which may be mentioned are lubricants, such as fatty acid esters, metal soaps thereof, fatty acid amides and silicone compounds, antiblocking agents, inhibitors, stabilizers against hydrolysis, light, heat and discoloration, flameproofing agents, dyestuffs, pigments, inorganic and organic fillers and reinforcing agents, which can be prepared according to the prior art and can also be charged with a size. Further details on the auxiliary substances and additives mentioned can be found in the technical literature, for example J. H. Saunders, K. C. Frisch: "High Polymers", volume XVI, Polyurethane [Polyurethanes], part 1 and 2, Interscience Publishers 1962 and 1964, R. Gächter, H. Müller (ed.): Taschenbuch der Kunststoff-Additive [Handbook of plastics additives], 3rd edition, Hanser Verlag, Munich 1989 or DE-A-29 01 774.

The PMMA component should be chosen such that the melt index MVR at 200° C. and 21.6 kg is between 5 and 70.

The EVA component should be chosen such that the melt index MVR at 200° C. and 2.16 kg is between 10 and 80 and the vinyl acetate content is at least 20%.

A description of plasticizers which can be employed in the moulding compositions according to the invention is to be found in R. Gächter, H. Müller (ed.): Taschenbuch der Kunststoff-Additive [Handbook of plastics additives], 3rd edition, Hanser Verlag, Munich 1989. Those compounds which have a low volatility are particularly suitable for the moulding compositions according to the invention.

Examples of these are phthalic acid $C_{10}/C_{12}$-alkyl esters, di-2-ethylhexyl phthalate (DOP), diisooctyl phthalate (DIOP), diisodecyl phthalate (DIDP), di-n-octyl phthalate, tri-2-ethylhexyl trimellitate (TOTM) and tri-n-octyl trimellitate.

PVC components which can be used have a hardness in the range from 65 to 85 Shore A, a melt index MVR at 155° C. and 21.6 kg in the range from 5 to 50, preferably 10 to 30 and an average particle size between 50 and 500 μm, preferably between 50 and 300 μm.

The moulding compositions according to the invention can be prepared by blending the TPU granules, which have been prepared by known processes with the particular components and plasticizer and additives and compounding the mixture by re-extrusion in a manner known to those skilled in the art. The resulting moulding composition is then granulated and converted by cryogenic grinding into a sinterable powder. Such powders have average particle sizes of 50 to 800 μm, preferably of 50 to 500 μm. Sinterable powders of moulding compositions which comprise only PVC and TPU, may in an additional embodiment be obtained by mixing TPU powder and PVC powder instead of by compounding.

The moulding compositions according to the invention are suitable for the production of the most diverse shaped articles, for example films, in particular grained sintered films. In powder form, the polyurethane moulding composition according to the invention can be sintered to skins in heatable moulds by the known "powder-slush process". This process has been described in the literature, see for instance U.S. Pat. Nos. 5,525,274 and 5,525,284 incorporated herein by reference.

The powder required for this is obtained from the granules of the polyurethane moulding composition according to the invention by cold grinding. The ground material is introduced into the heatable mould, which is open on one side, and sintered on to the internal wall of the heated surface within a short time. After the mould has been cooled, the slush skin can be removed. The process is therefore analogous to that for the production of fittings panel coverings of PVC skins. It is described as the "powder-slush process", for example, in DE-A 39 32 923.

The powder according to the invention already sinters on to the internal wall of the heated mould within a short time to give a homogeneous film which is free from small holes and bubbles and the film can already be formed without delay after cooling to only 100° C. These factors make the sintering process with the moulding composition according to the invention particularly economical.

The sintered film produced from this polyurethane moulding composition has a flexible and leathery feel and does not tend towards a change in the degree of gloss even under exposure to light. The grained pattern does not change during ageing in hot air (110 to 120° C.); likewise, no change occurs during heat ageing by storage on a grating at 130° C.

The sintered films produced from the polyurethane moulding compositions according to the invention are suitable, for example, for use as a surface lining in means of transport, e.g. aeroplanes, ships, railways trains or motor vehicles, in particular as a lining for instrument panels and as a covering for airbags, since the films adhere outstandingly to the polyurethane backing foam of the instrument panel. The present invention therefore also provides the use of the films according to the invention as a surface lining for instrument panels in means of transport, in particular in motor vehicles.

EXAMPLES

TPU Recipes

TPU 1 (DE-C 42 03 307)
70.00 parts by weight polycarbonate-diol based on 1,6-hexanediol of $\overline{M}_n$=2,000
30.00 parts by weight polyester-diol based on adipic acid, hexanediol and neopentylglycol of $\overline{M}_n$=2,000
30.00 parts by weight hexamethylenediisocyanate
11.88 parts by weight 1,4-butanediol TPU 2
70.00 parts by weight polycarbonate-diol based on 1,6-hexanediol of $\overline{M}_n$=2,000
30.00 parts by weight polycaprolactonediol of $\overline{M}_n$=2,000
30.10 parts by weight hexamethylenediisocyanate
11.70 parts by weight 1,4-butanediol TPU 3
70.00 parts by weight polycarbonate-diol based on 1,6-hexanediol of $\overline{M}_n$=2,000
34.00 parts by weight polybutanediol adipate of $\overline{M}_n$=2,250
30.20 parts by weight hexamethylenediisocyanate
11.70 parts by weight 1,4-butanediol

Preparation Process

The aliphatic thermoplastic polyurethanes were prepared in a one-stage process. The polyol components, hexamethylenediisocyanate and 1,4-butanediol were preheated to 90° C. and polymerized in an extruder and the polymer was then granulated.

Compounding

The compounding of the TPU with the other components was carried out on an extruder of the type DSE 25, 4 Z, 360 Nm of the following construction:

1. cold intake zone with conveying elements,
2. first heating zone (165° C.) with 1st kneading zone,
3. second heating zone (175° C.) with conveying elements and second kneading zone,
4. third heating zone (180° C.) with kneading zone, conveying elements and vacuum degassing,
5. fourth heating zone (185° C.) with conveying elements and a mixing zone,
6. crosshead (185° C.) and die (180° C.).

The material was processed to granules with a strand granulator. After a first compounding, which was carried out at a speed of rotation of 220 rpm and a conveying rate of 10 kg/h, a second pass was carried out at 220 rpm and a throughput of 15 kg/h. Before the second pass, the granules were dried in a vacuum drying cabinet for 1 h at 60° C.

After the compounding and granulation, the material was subjected to cryogenic grinding on a baffle plate mill or disc mill cooled with liquid nitrogen. A powder with an average particle diameter of <500 μm was obtained.

The components to be compounded can be metered in various ways:

a) the premixed granules, pulverulent additives (stabilizers, pigments) and liquid components (e.g. UV stabilizers) are introduced into the intake zone via separate gravimetric metering units;

b) as a), but the liquid components are fed in via a lateral metering unit;

c) all the components are premixed in a heated mixer at 90° C. During this, the liquid components diffuse into the granules and as a result pulverulent components stick to the granules. A dry, conveyable premix which can be introduced into the extruder via a metering unit is obtained in this way.

Comparison 1

In a compounding step, standard pigments (2% Elftex® 435 from Cabod), UV stabilizer (Tinuvin® 328 and 622), antioxidant (Irganox® 245) and release agent (Loxiol® C78) were added to TPU 1 in a compounding step, the mixture was re-extruded and granulated and, finally, the granules were ground to a fine powder with a particle size distribution of 50 to 500 μm, while cooling with liquid nitrogen.

Comparison 2

In a compounding step, standard pigments (2% Elftex® 435 from Cabod), UV stabilizer (Tinuvin® 328 and 622), antioxidant (Irganox® 245) and release agent (Loxiol® C78) were added to TPU 2 in a compounding step, the mixture was re-extruded and granulated and, finally, the granules were ground to a fine powder with a particle size distribution of 50 to 500 μm, while cooling with liquid nitrogen.

Comparison 3

In a compounding step, standard pigments (2% Elftex® 435 from Cabod), UV stabilizer (Tinuvin® 328 and 622), antioxidant (Irganox® 245) and release agent (Loxiol® C78) were added to TPU 3 in a compounding step, the mixture was re-extruded and granulated and, finally, the granules were ground to a fine powder with a particle size distribution of 50 to 500 μm, while cooling with liquid nitrogen.

Example 1

73 parts by wt. TPU 1 were compounded with 20 parts by wt. EVA (Baymod® 2418, Bayer AG) and 7 parts by wt. PMMA (Paraloid® K125, Röhm and Haas), together with standard pigments (2% Elftex® 435 from Cabod), UV stabilizer (Tinuvin® 328 and 622), antioxidant (Irganox® 245) and release agent (Loxiol® C78).

Example 2

72 parts by wt. TPU 3 were compounded with 5 parts by wt. EVA (Baymod® 2418, Bayer AG) and 23 parts by wt. PMMA (Lucryl® G66 BASF AG), together with standard pigments (2% Elftex® 435 from Cabod), UV stabilizer (Tinuvin® 328 and 622), antioxidant (Irganox® 245) and release agent (Loxiol® C78).

Example 3

77 parts by wt. TPU 3 were compounded with 23 parts by wt. PMMA (Lucryl® G66, BASF AG), together with standard pigments (2% Elftex® 435 from Cabod), UV stabilizer (Tinuvin® 328 and 622), antioxidant (Irganox® 245) and release agent (Loxiol® C78).

Example 4

70 parts by wt. TPU 3 were compounded with 30 parts by wt. PMMA (Lucryl® G66, BASF AG), together with standard pigments (2% Elftex® 435 from Cabod), UV stabilizer (Tinuvin® 328 and 622), antioxidant (Irganox® 245) and release agent (Loxiol® C78).

Example 5

73 parts by wt. TPU 3 were compounded with 22 parts by wt. PMMA (Lucryl® G66 BASF AG) and 5 parts by wt. 1,2-benzenedicarboxylic acid C10/C12 alkyl ester (Linplast® 1012 BP, RWE-DEA AG für Mineralöl und Chemie, D-47443 Moers), together with standard pigments (2% Elftex® 435 from Cabod), UV stabilizer (Tinuvin® 328 and 622), antioxidant (Irganox® 245) and release agent (Loxiol® C78).

The granules obtained in the examples were ground to a fine powder with a particle size distribution of 50 to 400 µm, while cooling with liquid nitrogen.

Example 6

A powder mixture of in each case 50 parts by wt. Comparison 1 powder and PVC slush powder (BK TL 640, Benecke-Kaliko AG, D-30419 Hannover) was prepared.

To produce test specimens, the powders were slushed to rings in a heatable cylinder of 21 cm diameter and 15 cm height. At an average filling amount of approx. 80 g of these TPU powders, slush rings approx. 0.8 mm thick were obtained.

The following measurements were carried out on the materials obtained in the examples:

- tear strength and elongation at break at room temperature in accordance with EN ISO 527-3/5,
- tear strength and elongation at break at −35° C. in accordance with EN ISO 527-3/2,
- fogging (3 h/100° C.) in accordance with DIN 75201,
- condensate (16 h/100° C. and 16 h/120° C.) in accordance with DIN 75201,
- MVR at 200° C. under 2.16 kg in accordance with ISO 1133,
- light-fastness (5 cycles) in accordance with DIN 75202,
- storage in heat (500 h/120° C.), suspended in a circulating air drying cabinet with ±2° C. tolerance.

The results of the measurements are summarized in the following table:

|  | Tear strength [N/mm$^2$] | | Elongation at break [%] | | Fogging [%] | Condensate [mg] | | MVR [cm$^3$/10 min] | Light-fastness [rating] | | Storage in heat (120° C./500 h) | |
| --- | --- | --- | --- | --- | --- | --- | --- | --- | --- | --- | --- | --- |
|  | RT | −35° C. | RT | −35° C. | 3 h/100° C. | 16 h/ 100° C. | 16 h/ 120° C. | 200° C./ 2.16 kg | 1 cycle | 5 cycles | tear strength | elongation at break |
| Comparison 1 | 30 | 38 | 600 | 480 | 88 | 0.5 | 4.4 | 45.60 | 4–5 | 4 | 31 | 580 |
| Comparison 2 | 30 | — | 635 | — | 93 | 0.5 | 3.1 | 48.67 | 4–5 | 4 | 31 | 620 |
| Comparison 3 | 32 | 40 | 730 | 330 | 92 | 0.5 | 2.0 | 75.67 | 4–5 | 4 | 31 | 680 |
| Example 1 | 11 | 30 | 300 | 180 | 92 | 1.31 | 4.5 | 46.29 | 4–5 | 4 |  |  |
| Example 2 | 13 | 22 | 430 | 75 | 90 | 0.80 | 3.6 | 19.40 | 4–5 | 4 |  |  |
| Example 3 | 15 | 24 | 450 | 101 | 88 | 0.76 | 3.7 | 21.91 | 4–5 | 4 |  |  |
| Example 4 | 9 | 19 | 30 | 34 | 88 | 0.61 | 3.4 | 17.17 | 4–5 | 4 |  |  |
| Example 5 | 12 | 20 | 420 | 95 | 85 | 0.8 | 4.0 | 59.22 | 4–5 | 4 |  |  |
| Example 6 | 13 | 21 | 340 | 69 | 92 | 0.4 | 2.1 | 73.42 | — | — |  |  |

What is claimed is:

1. A thermoplastic molding composition in powder form consisting of
   (i) a thermoplastic polyurethane based on an aliphatic diisocyanate,
   (ii) at least one component selected from the group consisting of polyvinyl chloride, polymethyl methacrylate and ethylene/vinyl acetate copolymer, and optionally
   (iii) a plasticizer,
   said powder form having average particle size of 50 to 800 µm.

2. The thermoplastic composition of claim 1 wherein said component is polyvinyl chloride.

3. The thermoplastic composition of claim 1 wherein said component is polymethyl methacrylate.

4. The thermoplastic composition of claim 1 wherein said component is ethylene/vinyl acetate copolymer.

5. A thermoplastic molding consisting of in powder form comprising a blend of
   i) 10 to 90 parts by weight of a thermoplastic polyurethane based on an aliphatic diisocyanate, and
   ii) 10 to 90 parts by weight of polyvinyl chloride,
   said powder form having an average particle size of 50 to 800 µm.

6. A molded article prepared by powder-slush process comprising the molding composition of claim 1.

7. The molded article of claim 6 characterized in that its tear strength at room temperature is not more than 20 N/mm$^2$ and an elogation at break at room temperature is not more than 450% (in each case measured in accordance with EN ISO 527-3/5).

8. The molded article of claim 6 characterized in that its tear strength at −35° C. is not more than 30 N/mm² and elongation at break at 35° C. is not more than 200% (in each case measured in accordance with EN ISO 527-3/2).

9. A thermoplastic molding composition in powder form comprising 50 to 90 parts by weight of thermoplastic polyurethane based on an aliphatic diisocyanate, 10 to 50 parts by weight of polymethyl methacrylate, up to 10 parts by weight of ethylene/vinyl acetate copolymer and up to 10 parts by weight of a plasticizer, said powder form having an average particle size of 50 to 800 μm.

10. A thermoplastic molding composition in powder form comprising thermoplastic polyurethane based on an aliphatic diisocyanate, and at least one component selected from the group consisting of polyvinyl chloride, polymethyl methacrylate and ethylene/vinyl acetate copolymer, and a plasticizer, said powder form having an average particle size of 50 to 800 μm, said thermoplastic polyurethane being the product of reacting I) 100 parts by weight of a polyol mixture of
  i) 30 to 80 parts by weight of an aliphatic polycarbonate-diol with a number average molecular weight of 1800 to 2200 and
  ii) 70 to 20 parts by weight of a polyalkanediol adipate or a polycaprolactone diol with a number average molecular weight of 1000 to 4000, and
  iii) 1,6-hexamethylenediisocyanate, in an equivalent ratio of 2.3:1.0 to 6.2:1.0, based on the polyol mixture, and 1,4-butanediol as a chain lengthening agent in an equivalent ratio of 1.3:1.0 to 5.2:1.0, based on the polyol mixture, characterized in that its NCO index is about 96 to 99.

11. A thermoplastic molding consisting of in powder form comprising
  (i) a thermoplastic polyurethane based on an aliphatic diisocyanate,
  (ii) at least one component selected from the group consisting of polyvinyl chloride, polymethyl methacrylate and ethylene/vinyl acetate copolymer, said powder form having average particle size of 50 to 500 μm.

* * * * *